United States Patent [19]

Brault

[11] Patent Number: 4,894,004
[45] Date of Patent: Jan. 16, 1990

[54] APPARATUS FOR MOLDING MULTI-COLORED PLASTIC SHELLS

[75] Inventor: Alfred F. Brault, South Berwick, Me.

[73] Assignee: Davidson Textron Inc., Dover, N.H.

[21] Appl. No.: 267,356

[22] Filed: Nov. 4, 1988

[51] Int. Cl.⁴ .......................... B28B 7/24; B28B 1/16; B28B 1/20; B29C 39/12
[52] U.S. Cl. ..................... 425/435; 249/52; 249/83; 249/105; 249/137; 264/245; 264/255; 264/308; 264/310; 264/311; 264/DIG. 60; 425/425; 425/434; 425/436 R; 425/257
[58] Field of Search ............ 425/425, 429, 430, 434, 425/435, 130, 145, 256, 8, 217, 257, 436 R, 436; 264/245, 255, 299, 302, 303, 311, 308, 309, 310, 144, 122, 45.7, 46.6, DIG. 76, DIG. 60; 249/119, 129, 130, 52, 83, 105, 137

[56] References Cited

U.S. PATENT DOCUMENTS

| | | | |
|---|---|---|---|
| 1,293,535 | 2/1919 | Perry | 425/8 |
| 3,028,283 | 4/1962 | Lundgren et al. | 264/245 |
| 3,123,403 | 3/1964 | Hood | 264/46.6 |
| 3,492,307 | 1/1970 | Hoskinson | 425/145 |
| 3,493,994 | 2/1970 | Wersosky et al. | 425/217 |
| 4,042,663 | 8/1977 | Harder, Jr. | 264/310 |
| 4,055,613 | 8/1977 | Kapral | 264/DIG. 60 |
| 4,122,146 | 10/1978 | Bertrandi | 264/245 |
| 4,331,626 | 5/1982 | Colby | 264/310 |
| 4,562,025 | 12/1985 | Gray | 425/434 |
| 4,606,868 | 8/1986 | Christoph et al. | 425/256 |
| 4,608,213 | 8/1986 | Kurumizawa et al. | 249/129 |
| 4,610,620 | 9/1986 | Gray | 425/435 |
| 4,692,293 | 9/1987 | Gray | 264/245 |
| 4,722,678 | 2/1988 | Wersosky | 425/435 |
| 4,790,510 | 12/1988 | Takamatsu et al. | 264/302 |

Primary Examiner—Jeffery Thurlow
Assistant Examiner—Mathieu Vargot
Attorney, Agent, or Firm—John C. Evans

[57] ABSTRACT

An apparatus for forming a multi-colored integral vinyl skin shell including a heated mold and dual powder box arrangement wherein the mold is formed to include alternately positioned tear surfaces and recessed surfaces. The powder box has a plurality of spaced dams or dividers formed therein such that the dams cooperate with the respective recessed surfaces of the mold to provide clearance therewith that permit different colored powders in the compartments between the dams to cover the previously cleared tear surfaces and to flow past the selectively formed free ends of the dams to become integrally secured to the adjacent edge portions of the shell segments remaining in the areas of the recessed surfaces of the mold, forming the multi-colored, integral plastic shell. The dams or dividers have tapered sides formed on their distal ends for approximately the outer two thirds of the width of each dam, and an opening is formed therebetween into a central hollow section for recovering "contaminated" or mixed powders from two adjacent compartments.

4 Claims, 2 Drawing Sheets

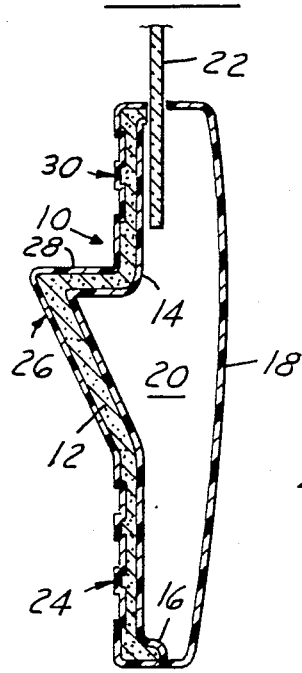
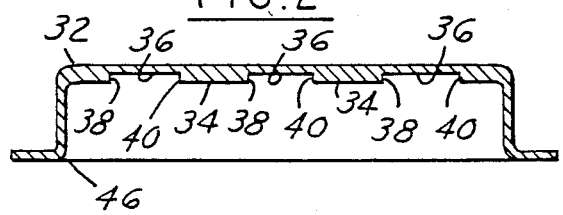
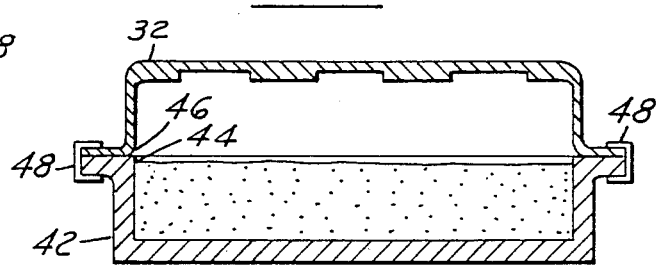
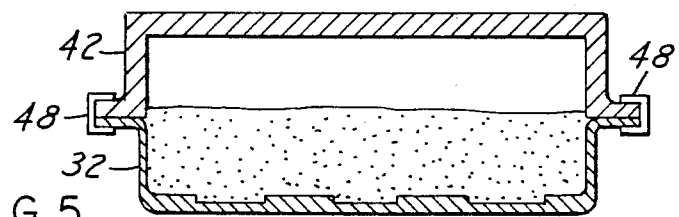
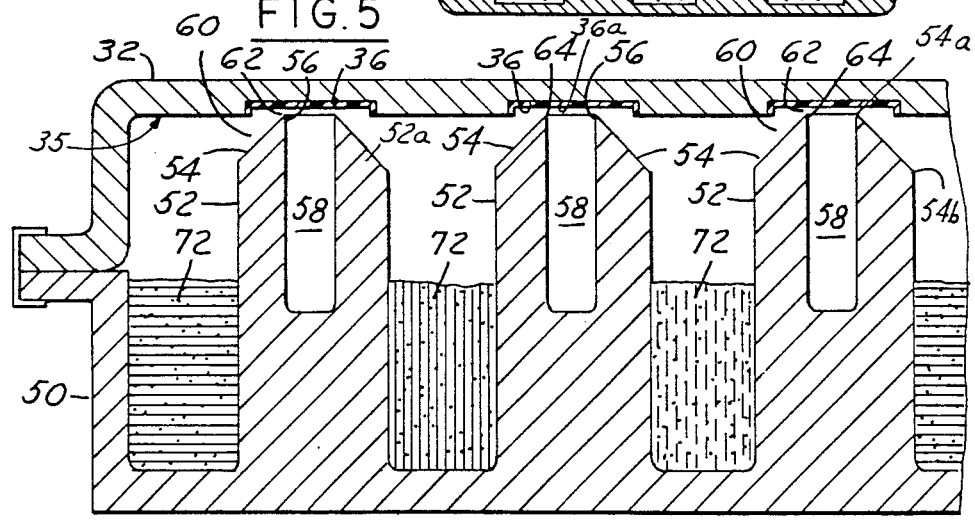

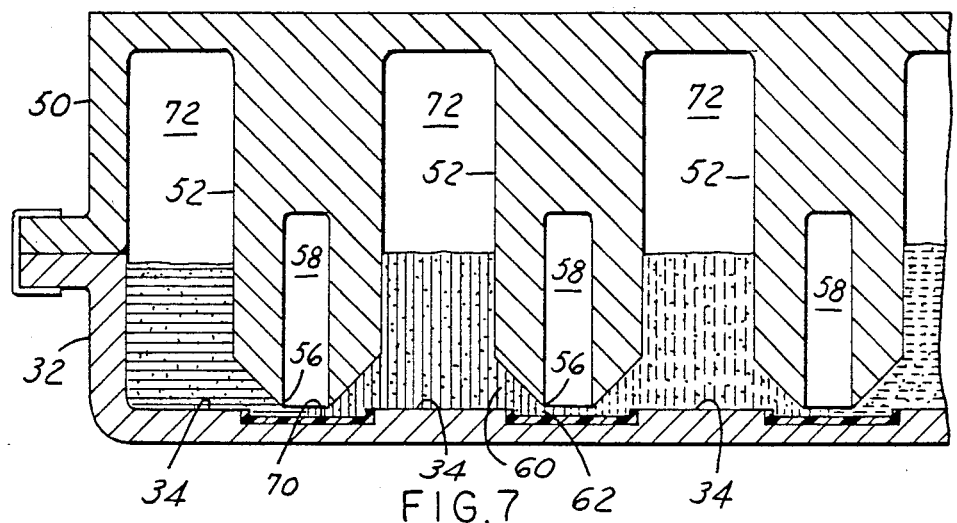
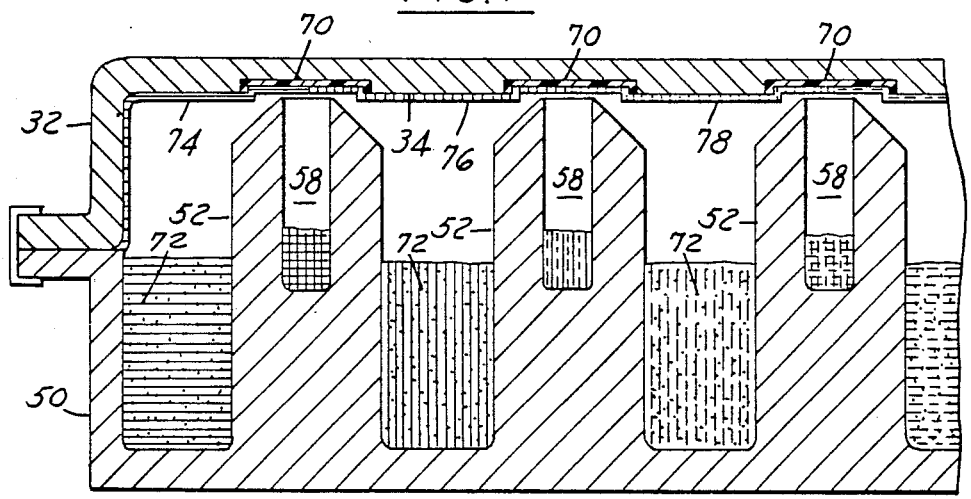
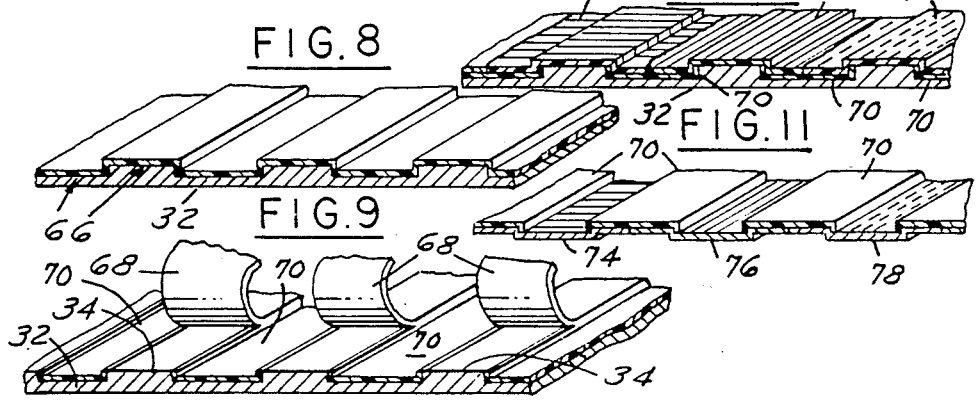

4,894,004

APPARATUS FOR MOLDING MULTI-COLORED PLASTIC SHELLS

TECHNICAL FIELD

This invention pertains to an improved plastic shell and a method and apparatus for making such articles especially suitable for use in automobile trim components such as interior door or instrument panels and more particularly to multitone plastic shells and method and apparatus for processing plastic powder to form such articles to have a plurality of tone colors.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been primarily due to this type of construction accommodating a wide latitude in styling and color, and grain effects which are most desired, particularly in the interior design of automobiles.

The current state of the art includes a pre-formed grained vinyl shell made from dry thermoplastic powder particles which are applied to a heated shell mold from a powder box to form a continuous monochromatic one-piece shell.

In order to enhance the interior decor of an automobile, interior door panels and other parts have been prepared which include two separate plastic shell sections.

The use of multi-color plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

U.S. Pat. No. 3,028,283 issued Apr. 3, 1962 discloses a golf grip of multi-color strips with a separating bead simulating a paint stripe.

Apparatus and method for multiple colored thermoplastic floor materials are set forth in U.S. Pat. No. 3,383,442 issued May 14, 1986.

U.S. Pat. No. 4,562,025 issued Dec. 31, 1985, with a common assignee to the present application, covers a Mold Method and Apparatus for Multi-Color Plastic Shells in which shell segments have their edges bonded at a common break-line.

DISCLOSURE OF THE INVENTION

A general object of the invention is to provide an improved integral vinyl skin shell which contains sections and/or strips having a plurality of different color tones, and suitable for use as an interior panel component of an automobile.

Another object of the invention is to provide an improved process for forming such a multi-colored integral vinyl skin shell.

A further object of the invention is to provide an improved mold and powder box apparatus for forming such a multi-colored integral vinyl skin shell.

Still another object of the invention is to provide a heated mold and a powder box apparatus wherein the mold includes a plurality of spaced tear surfaces alternating with recessed surfaces, and a powder box having a plurality of dams or dividers of a predetermined configuration formed therein between powder compartments for operative cooperation with the recessed surfaces of the heated mold to cause powder from the compartments to cover the tear surfaces and to overlap shell segments included in the recessed surfaces to become integrally connected thereto.

A still further object of the invention is to provide a process for forming a multi-colored integral vinyl skin shell including a heated mold and dual powder box arrangement wherein the mold is formed to include alternately positioned tear surfaces and recessed surfaces such that after the first powder box supplies a layer of powder to cover all the surfaces to form a shell, the strips of shell on the tear surfaces are removed, after which the first powder box is replaced by a second powder box having a plurality of spaced dams or dividers formed therein such that the dams cooperate with the respective recessed surfaces of the mold to provide clearance therewith that permit different colored powders in the compartments between the dams to cover the previously cleared tear surfaces and to flow past the selectively formed free ends of the dams to become integrally secured to the adjacent edge portions of the shell segments remaining in the areas of the recessed surfaces of the mold.

Still another object of the invention is to provide the above referenced dams or dividers with distal ends having tapered sides formed thereon for approximately the outer two thirds of the width of each dam, and an opening therebetween into a central hollow section for recovering "contaminated" or mixed powders from two adjacent compartments.

These and other objects and advantages will become more apparent when reference is made to the following drawings and the accompanying description.

BRIEF DESCRIPTION OF THE DRAWINGS

FIG. 1. is a schematic view of a singlepiece multi-colored panel of the present invention shown with associated component parts of an automotive door panel;

FIG. 2 is a diagrammatically shown sectional view of a mold component of the inventive apparatus;

FIG. 3 is a diagrammatically shown sectional view of a conventional prior art powder box sealed to the mold of FIG. 2 in the pre-release or "mold-up" position;

FIG. 4 is a diagrammatically shown sectional view showing the powder box and mold of FIG. 3 in a powder-release or "mold-inverted" orientation;

FIG. 5 is an enlarged, fragmentary, diagrammatically shown sectional view of a powder box of the invention sealed to the mold of FIG. 2 in its pre-release or mold-up position;

FIG. 6 is an enlarged, fragmentary, diagrammatically shown sectional view showing the powder box and mold of FIG. 5 in a powder-release or mold-inverted orientation;

FIG. 7 is an enlarged, fragmentary, diagrammatically shown sectional view showing the powder box and mold returned to the mold-up position;

FIGS. 8–11 are fragmentary enlarged diagrammatically shown sectional views of a portion of the mold during various operational steps of the inventive process.

BEST MODE OF CARRYING OUT THE INVENTION

The process, apparatus and article of the present invention will be with reference to the production of plastic thin-walled shells for typical automotive parts, such as interior door panels, consoles and instrument panels.

FIG. shows a typical automobile door panel application of a multi-color, single-piece interior plastic shell 10. The shell 10, preferably made of polyvinyl chloride material, is backed by a layer of polyurethane foam 12 bonded to the shell 10 by a mold process such as in U.S. Pat. No. 3,123,403 issued Mar. 3, 1964 for Automobile Arm Rest. An interior reinforcing insert 14 is connected at a joint 16 to an outer door shell 18 to form an interior space 20 for window lift mechanism (not illustrated) to raise and lower a window 22.

In accordance with the present invention the shell is a one-piece plastic part with an integral lower panel 24 of a drycast plastic having a first color, an intermediate panel 26 including an armrest segment 28 formed of the drycast plastic having a second color, and an upper panel 30 contrasting or complementing the color of the panels 24 and 26 or other interior components. For example, the upper panel can be red, blue, yellow or beige to contrast with or complement the interior color of seats, headliners, crashpads and the like. The lower panel 24 can be colored a deeper complementary tone color of a character which has a low impact or scuff display character. The intermediate panel 26 can be a color complimentary to the colors of lower panel 24 and upper panel 30.

Referring to FIGS. 2-6, a powder molding process line is schematically shown as including a selectively heated mold 32. A plurality of spaced tear surfaces 34 are formed in the casting surface 35 of the mold 32, with recessed surfaces 36 located alternately therebetween and having oppositely disposed wall portions 38 and 40 interconnecting each recessed area 36 with the adjacent tear surfaces 34. A conventional powder box 42 is operated between raised and lowered positions with respect to the mold 32 by suitable handling equipment. The box 42 further includes an upper open end 44 which is configured to cover the planar extent of an opening 46 to the mold 32.

Clamp means 48 join and seal the powder charge box 42 to the mold 32 when the box is elevated to the mold-inverted position shown in FIG. 4, in which the mold cavity faces downwardly.

As joined, the interior of the box 42 and the interior of the mold 32 form a closed system having a powder charge in the box.

In accordance with the process and apparatus of the present invention, a powder box 50 (FIG. 5) the same size as the box 42, is provided with a plurality of spaced dams or dividers 52, each of a width a predetermined amount wider than the width of the respective recessed areas 36 with which they are aligned, and of a length which cooperates with the areas 36 to provide a predetermined clearance therewith. Specifically, the distal end of each dam 52 includes opposite tapered sides 54, each of which spans approximately the outer one third of the width of the dam. Each tapered side 54 has an inboard edge 54a and an outboard edge 54b. The middle one-third of each dam consists of an opening 56 into a hollow section 58 of a predetermined depth for a purpose to be described. The taper of each side 54 is such that a greater clearance 60 exists between the side 54 and the adjacent respective wall portions 38 or 40 of the recessed area 36 than a clearance gap 62 at the edge 64 of each side 54 at the opening 56, for a purpose to be described. More specifically, as shown in FIG. 5, the hollow section is formed in the distal end 52a of the dam 52 adjacent the longitudinal central portion 36a of each recess 36.

Insofar as the inventive process is concerned, the powder box 42 (FIG. 3) must first be used, wherein such powder box is completely open, without having any of the dams or dividers 52 included therein. As a completely open box 42, only one color plastic powder is contained therein. After being clamped to the heated mold 32 by the clamp means 48 in the mold-up position, and then rotated 180 degrees into the mold-inverted position for a predetermined period of time, the plastic powder covers the entire tear and recessed surfaces of the mold. When rotated back to the mold-up position, the mold is removed from the powder box 42, but now includes a thin layer or shell 66, as shown in FIG. 8.

As a second step, the strips 68 are removed from the tear surfaces 34, as shown in FIG. 9, leaving the recessed areas 36 lined with shell segments 70, as shown in FIG. 6.

For the next step, the powder box 50 and its associated dams 52 are clamped to the heated mold 32 in the mold-up position, with a different color plastic powder in each compartment 72. When rotated into the mold-inverted position, the various powders fall onto the respective tear surfaces 34. As indicated in FIG. 6, the respective powders flow first through the adjacent clearances 60 and then past the clearances 62, such that a portion of each color powder rests below the opening 56.

Upon return to the mold-up position (FIG. 7), the excess powder which does not adhere to the tear surfaces 34, along with the excess powder from the space adjacent the tapered sides 54, fall back into the bottoms of the respective compartments 72, ready to be used again in the next cycle. During the rotation into the mold-up position, the portions of the different colored powders adjacent the opening 56 are restrained by the shallow clearances 62 and caused to fall into the respective hollow sections 58, from which the now "contaminated" mixtures can be removed in any suitable manner, such as by an automatic vacuum arrangement.

The finished multi-colored vinyl skin shell is shown in FIG. 11 as it appears after it has been removed from the mold 32 of FIG. 7.

INDUSTRIAL APPLICABILITY

It's apparent that the vinyl skin shell integrally formed in the above described manner and removed from the mold 32 includes a plurality of different colored sections 74, 76 and 78 between the spaced original shell segments 70, and may form the respective panels 24, 26 and 30 of the particular interior door panel shell 10 of FIG. 1.

Examples of suitable mold heating processes for use with the process and apparatus of the present invention include mold temperature control by heated and cooled air or oil heating and cooling flow as set forth in U.S. Pat. No. 4,217,325 issued Aug. 12, 1980. Suitable thermoplastic powders include plasticized polyvinyl chlorides and related vinyl resins in dry powder form for ease of gravity flow from the powder charge boxes 42 and 50 during both fill and return steps. Typical examples of parts, plastic materials and mold processes include the following:

Examples of parts that have been made by the PVC powder molding process include a door panel shell having a mold volume of approximately six (6) cubic feet.

PVC resin, plasticizer, stabilizer, release agents and color pigments are combined in a high intensity mixer to produce a dry, flowable powder of each desired color. The process is known in the industry as dry-blending.

The various compound components may be selected as to type and ratio to provide the properties required both for the finished product and for ease of processing. Physical properties will not be too dissimilar from those obtained with liquid plastisol which is also used to manufacture similar products but has an inherent weakness for forming objectionable drips and runs when made in complex shapes.

Processing properties are such that when melting of the plastic powder occurs, densification results in exact reproduction of minute detail such as selected grain marks and/or stitches engraved in the mold surface.

Mold preheating temperature may range from 250 degree F. to 450 degree F. The thickness of the finished product is governed by the length of time that the powder is in contact with the mold, in combination with the mold temperature. Hence, if certain areas of the mold can be made to have a lower pre-heated temperature than others, it will permit molding a thinner shell in those areas. Therefore, a very flexible range, for mold-filled time, of one second to more than ten seconds has been used.

Depending on formulation, complete melting or fusion of the PVC powder can occur when mold temperatures reach 350 degree F. to 450 degree F. After fusion, the mold is cooled to a temperature which will facilitate removal of the shell without damage.

Specifically, the process and apparatus of the present invention enable even and complete distribution of thermoplastic powder material onto mold surface to form large, long, thin-walled single-piece multi-colored shells.

While representative embodiments of apparatus and process of the present invention have been shown and discussed, those skilled in the art will recognize that various changes and modifications may be made within the scope and equivalency range of the present invention.

The embodiments of the invention in which an exclusive property or privilege are defined as follows:

1. In a mold and powder box assembly connected together by suitable clamp means, and wherein the mold includes a casting surface having a plurality of raised alternate surfaces and recesses having spaced wall portions and a bottom, a powder box comprising a housing, spaced dams mounted in the housing providing compartments therebetween and adapted to carry thermoplastic powder in each compartment, means for connecting said powder box to said mold for aligning each dam adjacent one of said recesses, each dam having a length which provides a predetermined clearance gap between said dam and said one of said recesses and a hollow section formed in the end of each dam adjacent the longitudinal central portion of each recess.

2. The powder box described in claim 1, wherein each dam includes a distal end having a width greater than the width of said one of said recesses.

3. The powder box described in claim 2, wherein the distal end of each dam includes opposite tapered sides, said tapered sides overlying the wall portions of said one of said recesses and each tapered side comprising approximately the outer one-third of the width of the dam, with said hollow section therebetween.

4. The powder box described in claim 3, each of said tapered sides having an inboard edge and an outboard edge, a segment of said tapered side between the inboard edge and said outboard edge spaced from said wall portions by a distance which is greater than the distance of said inboard edge from said bottom of said one of said recesses.

* * * * *